RADIANT ENERGY SENSITIVE ELECTRONIC CURVE FOLLOWER

Filed June 24, 1964 2 Sheets-Sheet 1

INVENTORS
EVON C. GREANIAS
PHILIP F. MEAGHER
CHARLES E. SMYRK
BY Robert E. Sandt
AGENT June 4, 1968 E. C. GREANIAS ET AL 3,387,138

RADIANT ENERGY SENSITIVE ELECTRONIC CURVE FOLLOWER

Filed June 24, 1964 2 Sheets-Sheet 2

United States Patent Office 3,387,138
Patented June 4, 1968

3,387,138

RADIANT ENERGY SENSITIVE ELECTRONIC CURVE FOLLOWER

Evon C. Greanias, Chappaqua, Philip F. Meagher, Mahopac, and Charles E. Smyrk, Yorktown Heights, N.Y., assignors to International Business Machines Corporation, New York, N.Y., a corporation of New York Filed June 24, 1964, Ser. No. 377,749
11 Claims. (Cl. 250—219)

ABSTRACT OF THE DISCLOSURE

An electronic curve follower of the type wherein the radius of the scanning circle is reduced upon the detection of black and provides improved criteria for controlling the radius reducing attenuator. Such provision is primarily accomplished by delaying the operation of the attenuator for a fixed interval after the scanning spot enters the area of the line. During this interval, the photo-reflected signal is analyzed to ascertain that the scanning spot did enter the line. After such ascertaining, the attenuator is operated.

This invention relates to electronic servo apparatus, and more particularly to an electronic servo apparatus which is particularly adapted to follow the configuration of an imprinted lexical symbol and produce shape-manifesting signals especially suited for processing in a character recognition apparatus.

While scanning devices for scanning imprinted lexical symbols may vary greatly in their structural details, as well as in their modes of operation, they all operate in either a fixed or variable scan pattern. The fixed pattern scanners, of which the raster scanner is most typical, traverse each symbol or character in an invariable path and produce pulses spaced in time to represent the blacks of the character relative to the white background. These pulses, when correlated with the scanning pattern, represent the shape of the symbol in a binary rotation. The variable scan pattern devices are best ilustrated by the curve follower, which traces the character shape, thus following a different path for each different symbol. Curve followers yield time variant analog waveforms representing the successive orthogonal (or polar) coordinates of the trace.

The present invention constitutes an improvement in curve followers which permits not only an improved follower action, but also yields binary information signals in addition to the analog information signals. It thus combines the features of both a fixed pattern scanner and a variable pattern scanner. The binary signals provide the basis for ready recognition of features in lexical symbols such as T joints, corners, line ends, line breaks, and other abrupt discontinuities in the symbols.

It is, therefore, an object of this invention to provide a scanning device for imprinted line patterns which produces both analog and binary-like signals which manifest of the configuration of the pattern traced.

A further object is to provide an electronic curve follower apparatus which follows the outline of an imprinted lexical symbol and produces time variant analog waveforms representing the shape of the symbol as well as black and white manifesting symbols representing predetermined features within the symbol.

An even further object is to provide an electronic curve follower for following the outline of an imprinted lexical symbol wherein an illuminating spot is animated in an overlapping series of circular paths straddling the line and having a diameter greater than the line thickness in such manner as to follow on a single edge of the line in a closed trace.

Another object of the invention is to provide an electronic curve follower for following the edge of a line with a spot of light animated in a series of overlapping circular patterns having a combined dimension greater than the thickness of the line and straddling the line wherein details on the other side of the line may be detected.

Yet another object of the invention is to provide an electronic curve follower for following the edge of a line with a spot of light animated in a series of overlapping circular patterns having a diameter greater than the thickness of the line and disposed to straddle the line wherein the transitional illumination at the line edge initiates a timing action which is utilized only if the transition is followed by blackness having a predetermined persistence and quality.

Still another object is to provide an electronic curve follower in accordance with the foregoing object in which the line quality is tested with at least two different standards in accordance with the previous history of the beam intercepts with the line.

A further object is to provide an electronic curve follower for following the edge of a line in which an artificial line intercept signal is generated upon the failure of the beam to intercept the line within a prescribed interval to cause the tracing beam to bridge imperfections in the line.

The foregoing and other objects, features and advantages of the invention will be apparent from the following more particular description of a preferred embodiment of the invention as illustrated in the accompanying drawings.

Figure 1:
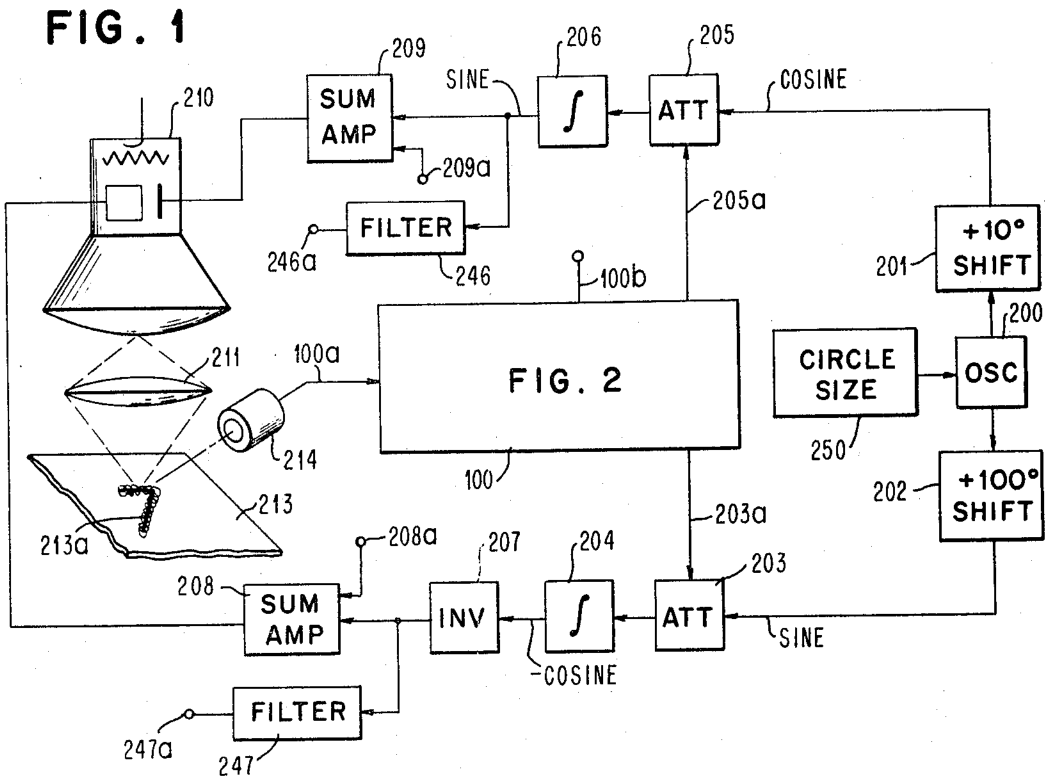
FIG. 1 is a schematic block diagram of the electronic curve follower embodying the improvements constituting the present invention.

In FIG. 1 there is shown a curve follower, which, except for circuits contained in the box 100, is generically similar to that shown in co-pending applications, Ser. Nos. 248,585 (filed Dec. 31, 1962), issued on Jan. 11, 1966 as U.S. Patent No. 3,229,100 to Evon C. Greanias for "Electronic Servo System," and assigned to the International Business Machines Corporation, and 306,119 (filed Sept. 3, 1963) and issued on Nov. 29, 1966 as U.S. Patent No. 3,289,004 to Evon C. Greanias and Philip F. Meagher for "Photosensitive Electronic Servo Apparatus For Curve Following," and also assigned to the International Business Machines Corporation. These prior followers and the instant one operate by alternately integrating two sinusoidal waveforms of two different respective amplitudes under control of a photodetector which senses the impingement of a spot of light, animated by the integrated sinusoids, upon the black of the character.

Specifically, in FIG. 1, the document 213, containing the lexical symbol 213*a* imprinted thereon in contrasting ink, is illuminated solely by the light from the cathode ray tube 210, whose sharply focused spot of light on the fluorescent tube face is imaged on the document by suitable optics 211. The spot image on the document is small relative to the line thickness. Light reflected from the document 213 is sensed by the photomultiplier 214 which controls the circuits within the box 100 to provide control on the lines 203*a* and 205*a* for the attenuators 203 and 205.

Neglecting for the moment the specific nature of the controls supplied by lines 203*a* and 205*a*, the attenuators 203 and 205 are essentially amplifiers having two different levels of gain controlled by the presence or absence of signals on the respective control lines 203*a* and 205*a*. Thus, sinusoidal oscillations originating in oscillator 200, and phase shifted respectively by 10° and 100° in phase shifters 201 and 202 to achieve a difference of 90° in phase, provide sine and cosine waveforms having the same amplitude to the attenuators 203 and 205 as described in patent 3,267,285, the circle size control 250 functions to adjust the amplitude of the oscillator 200 as a function of the character size measured in a first pass around the character. With no control signals applied to the lines 203*a* and 205*a*, these attenuators will pass the waveforms at the higher gain level (unity, for example). The integrators 204 and 206 receiving respectively sine and cosine waveforms as inputs will yield minus cosine and sine waveforms as outputs. These output waveforms have the same amplitude as the inputs and differ therefrom only in phase and polarity (in one instance). Actually, the polarity change merely represents a phase change of 180°. Therefore, to preserve a simple relationship, the inverter 207 is added. The waveforms now entering the summing amplifiers 208 and 209 are respectively cosine and sine waveforms. Again, it is merely a matter of reference as to which waveform is the sine and which the cosine. The important consideration is that these waveforms have the sinusoidal configuration, the same frequency and amplitude, and that they have a relative phase displacement of 90°. When waveforms having this relationship are applied through the summing amplifiers 208 and 209 to the deflection circuits of the cathode ray tube 210, the electron beam will be animated to trace a circular path on the screen, the diameter of which is proportional to the amplitude of the waveforms. If the circular trace is so positioned on the face of the cathode ray tube, by potentials applied to the hubs 208*a* and 209*a* of the summing amplifiers, to intercept the black of the symbol 213*a* during its revolution, the photomultiplier 214 will detect this change in the reflected light and initiate controls within the circuit box 100 to reduce the gain of the attenuators 203 and 205 for the requisite time. While the action of the attenuators in producing a following action will be discussed in detail, it will be intuitively appreciated that with no attenuation a circular path will be traced. If, during that period in the circular rotation when the beam is traveling substantially parallel to the line edge, the waveforms are attenuated, then lesser amplitude waveforms will be available for integration. The center of the circle will thus precess along the line by an amount equal to the lesser integrated energy. The circuits in the box 100 control the duration and timing of this attenuation.

In the preferred embodiment, the diameter of the circular pattern, when imaged on the symbol line, is .040″ with respect to a line thickness of perhaps .015″. The circular pattern is referenced to a single edge of the line only, the center thereof lying a fixed distance from the edge of the line, and within the line. The follower, in tracing a horizontal straight line, follows first on the top edge of the line attenuates at the bottom of the curve to produce a series of connected substantially circular traces. If the beam revolves counter-clockwise, the gross migrational movement will be from right to left. When the trace reaches the left end of the line, it will switch and follow the bottom edge of the line from left to right, now attenuating the waveforms at the top of the circular swing. When the trace reaches the right end of the line, it will reverse, repeating the first operation. In both traces, the loci of the centers of the circular traces will lie within the line being traced. Vertical lines, oblique lines, and curved lines will be similarly traced. The only difference in the operation in tracing oblique or curved lines lies in the quantities that are accumulated in the respective integrators. For a horizontal line, gross accumulations will be achieved in only one of the integrators (horizontal), and for vertical movement only the vertical integrator will accumulate a net charge after 360° of rotation of the beam. Oblique or circular lines will fill both integrators by the requisite amount to achieve the movement required. In all cases, the attenuation is effected for that arcuate distance which is substantially parallel to the edge of the line being followed.

Since the integrators 206 and 204 produce a high frequency sinusoidal waveform output as well as a slowly varying output, the filters 246 and 247 are provided to filter out the high frequency sinusoidal waveforms, leaving only the slowly varying potentials which represent the orthogonal coordinates of the character trace with respect to time. These time variant waveforms appearing at the hubs 246*a* and 247*a* are dynamically analyzed to provide the recognition of the symbol traced. In the prior curve followers, these waveforms were the sole source of raw data for recognition purposes. in the present invention, the circuits within the box 100 include detection means for giving sense to black return signals from the off-side of the line. Thus, for example, if the follower were following on the upper edge of the horizontal bar of the letter T, the large circular scan would produce a "black hit" when it intercepted the vertical bar of the letter. Three black hits during a single circular scan can be detected as a so-called T joint. Other configurations may be similarly detected directly. The photodetector 214 produces black and white manifesting signals. These signals are binary, or digital, in nature, in that they are either present or absent, as opposed to an analog signal which is ever present, but varies in magnitude to manifest its information. By relating the sequence of black and white signal returns to the periodicity of the oscillator 200 and to the line edge upon which the follower is operating, the circuits 100 give sense to binary signals originating in the photodetector. The extra binary output appears at the outlet hub 100*b*.

Figure 3:
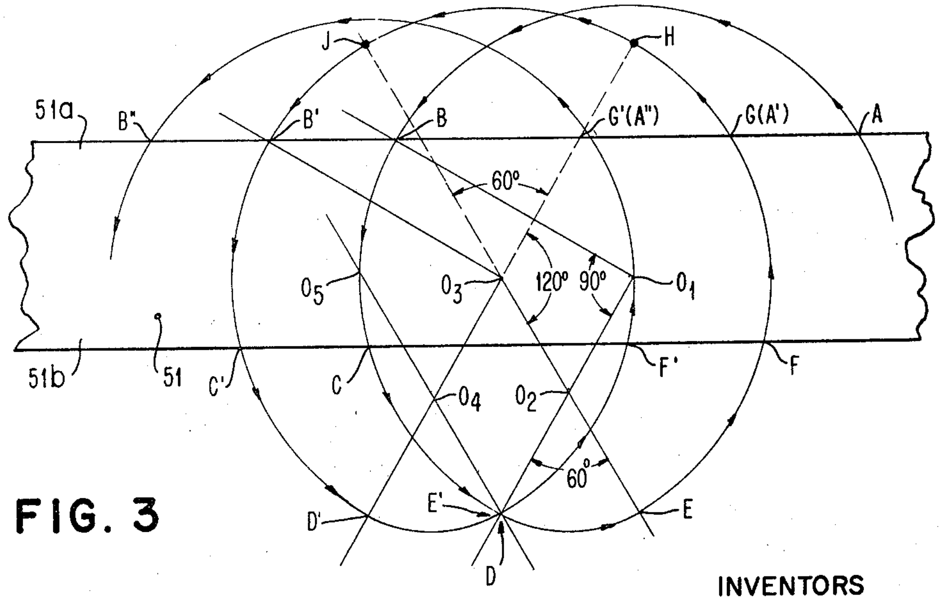

Before examining the interconnection of the circuit elements in the box 100, it is well to digress sufficiently to understand the mathematical relationships which those elements implement. Referring now to FIG. 3 and recalling that the circular trace 50 is adjusted to have an imaged diameter of .040″ relative to a line of .015″, it will be apparent that if the other parameters are properly chosen, the trace has the capability of completely sweeping the line it is following so as to detect discontinuities on both sides thereof. We shall confine our attention to the preferred parameters which include the dimensions herein above set forth, as well as an attenuation period equivalent to 60° of beam time and a delay of the start of the attenuation for the equivalent of 90° of beam time following the intercept of the line edge being followed.

With the foregoing parameters and a counterclockwise rotation, the tracing beam 50 will proceed from A to B, revolving in the white background about the center $O_1$ with a radius of .020″. At B, the intercept of the tracing spot with the black line edge initiates the 90° time delay before the start of the attenuation period. Rotation from B to C within the black of the line has no affect upon the follower action, nor does the exit from the line at C. The 90° delay interval expires at point D. Here the waveforms are attenuated by one half, and the timing of the attenuation period begun. With the one-half attenuation, the center of rotation instantaneously shifts from $O_1$ to $O_2$ and remains there for 60° of beam time while the beam rotates from D to E at a radius of .010″. At E, the 60° equivalent time period expires and the circle size returns to its former radius of .020″, thus shifting the center of rotation instantaneously from $O_2$ to $O_3$. The trace 50, rotating about $O_3$ as a center, travels in the white background from E to F, enters the line at F, and proceeds to G in the line. The cycle is now complete as point G (A′) represents the cyclical equivalent of the initial point A.

Each subsequent cycle is a mere repeat of that just traced with an attenuation of the beam to one half amplitude for 60° starting 90° after line edge intercept. The instantaneous successive shifts of the centers of rotation through $O_1$, $O_2$, $O_3$, $O_4$, $O_5$, etc., causes the gross migration of the beam to the left. When the high frequency sinusoidal waveforms are filtered out (by filters 246 and 247, FIG. 1), the remaining slowly variant waveforms will represent the orthogonal displacements of the locus of the odd-numbered centers of rotation $O_1$, $O_3$, $O_5$, etc.

While a more generalized mathematical relationship will be set forth, the specific parameters employed in the preferred embodiment produce a stable following action in which the centers of rotation of the large trace are located within the line 51 at a distance of .010″ from the edge 51*a* followed. Derivatively, therefore, the trace extends .010″ above the line edge 51*a*, and below the line edge 51*b* by .014″. The beam will also intercept the followed edge 51*a* at an angle of 60°, and the direction of migration will be 30° counter-clockwise relative to the line of intercept.

While the foregoing analysis has assumed a stable following operation along the edge of simple straight line, the apparatus, because it is a true servo will always seek to achieve this stable operation, whether it is following a curved line, a series of intersecting straight lines, or even when it is making its initial contact with a new symbol upon a search therefor. Assuming that search potentials are applied to the hubs 208*a* and 209*a* (FIG. 1) to produce a raster search pattern, with the superimposed circular dither due to the sinusoidal waveforms, and that the first intercept occurs at 6 o'clock beam time. The search potentials then freeze with the center of the circle .020″ from the line edge. Since the migration proceeds .010″ per cycle along a line 30° counter-clockwise from the intercept, the beam circle will move .010″ towards 5 o'clock. The next intercept will occur at 8 o'clock moving the center downward and to the left, placing it almost in the line edge. The next intercept at 9 o'clock moves the center into the edge of the line and to the left. After several more intercepts, the beam center will achieve its stable following position of .010″ from the line edge and successive intercepts at 10 o'clock.

If a line end is encountered, the circularly animated spot of light will find no intercept at 10 o'clock. Instead, the intercept will occur at 4 o'clock (approximately) which is displaced by 180°. This, after a special test cycle, will cause the horizontal integrator to receive voltage increments of opposite polarity and move the tracing beam from right to left instead of its former direction of movement.

Whenever the rotating spot of light intercepts the black of the line edge (under certain restraints to be discussed), it will initiate a follower action along that edge seeking the stable following conditions above set forth. Thus, if a horizontal upper line edge is being followed to the intersection with a vertical line edge, the follower will normally intercept the horizontal edge at 10 o'clock. The first intercept with the vertical edge might occur between slightly after 10 o'clock or as early as 11:40 (counter-clockwise rotation), depending on whether the tracing beam just reached the vertical edge, or just missed it in the cycle preceding.

For the special case of 90° delay and 60° attenuation, the expressions for beam location, extension, penetration, and migration are as follows:

(A) Beam advance per revolution:

$$A=R-KR$$

where $R$= radius of larger circular trace, and K is the attenuation factor.

(B) Distance of center from line edge followed:

$$D=\frac{R}{2}$$

(C) Extension beyond line edge followed:

$$E=\frac{R}{2}$$

(D) Penetration beyond inside edges of the line:

$$P=1.4R-T$$

The more generalized expression for the foregoing relations are as follows:

(1) Beam advance per revolution:

$$A=2(R-KR)\sin\frac{\alpha}{2}$$

where $R$=radius of large trace, K is the attenuation factor, and $\alpha$ the angle of attenuation.

(2) Distance of center from line edge followed:

$$D=R\sin\left(\beta+\frac{\alpha}{2}-90^\circ\right)$$

where $\beta$=delay angle.

(3) Extension beyond line:

$$E=R-R\sin\left(\beta+\frac{\alpha}{2}-90^\circ\right)$$

(4) Penetration with the line and beyond inside edge:

$$P=(R-KR)\sin\left(90^\circ-\frac{\alpha}{2}\right)+KR-T+R\sin\left(\beta+\frac{\alpha}{2}-90^\circ\right)$$

(5) Angle of beam intercept:

$$\alpha=180^\circ-\beta-\frac{\alpha}{2}$$

(6) Direction of beam advance:

$$\beta+\frac{\alpha}{2}-90^\circ$$

The foregoing general expressions encompass all followers operating upon the principle of alternate integration of a normal sinusoidal and an attenuated sinusoid. In the prior follower (application Ser. No. 248,585, filed Dec. 31, 1962), the angle $\beta$ was zero and the angle $\alpha$ was 180°. With these parameters, the distance (Equation 2) of the center of the edge followed was zero, meaning that the centers of the tracing circles lay in the line edge. The extension beyond the line edge (Equation 3) is simply the radius of the large circle. The peneration within the line (Equation 4), if there is penetration, is the difference between the attenuated radius and the line thickness. In that application the lesser radius was less than the line thickness, so there was no penetration. The advance per cycle was twice the difference of the two radii (Equation 1).

It is apparent that, although there are many combinations of angular delay, attenuation angle, circle size, and attenuation factor that will satisfy the foregoing relationships, they may not be arbitrarily chosen. For example, if a combination is chosen to yield a large beam advance per revolution (Equation (1)), then resolution will be prejudiced. A fast advance increases the probability of skipping over minute details of the character traced. Other choices might lead to an almost tangent angle of beam intercept (Equation 5), leading to poor line edge detection. While a normal (90°) intercept yields the optimum rate of change of illumination, as the beam intercepts a line edge, and a tangent intercept represents the opposite extreme, a 60° intercept angle is sufficiently close to the normal to produce a signal which is imperceptively different from the normal intercept while preserving a sharp transition. The preferred embodiment, for example, employs 60°. The choice of parameters is largely empirical and obtained by experimentation with a large sample of characters. The 90° delay, 60° attenuation angle, .040″ radius and an attenuation factor of .5 has been found to be satisfactory for the average handwritten numeral, written with a pencil or ball point pen on good grade paper stock. Other specimens made with liquid ink pens on absorbent paper would require a different set of parameters for stable operation.

Figure 2:
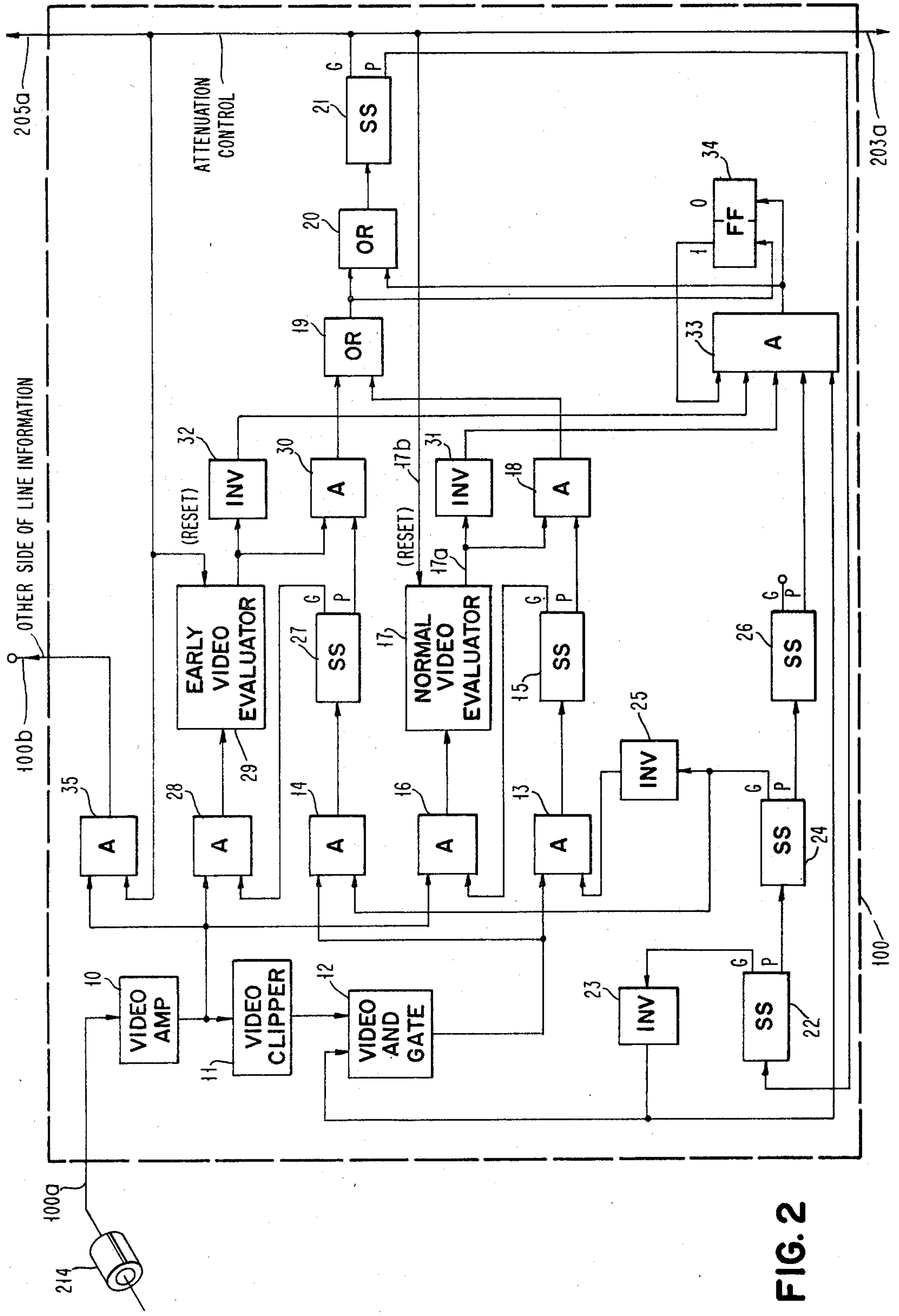
FIG. 2 shows the details of the block 100 of FIG. 1 and specifies the improvements that distinguish the present invention over prior curve followers.

Turning now to FIG. 2, which shows the circuit component enclosed within the box 100 of FIG. 1, it will be appreciated that this circuit's prime functions are timing and some simple logic. When at point B (FIG. 3) the tracing beam intercepts the line edge 51*a*, the photomultiplier 214 will experience a sharp diminution in the incidental light and will yield a corresponding electrical signal to the video amplifier 10. The amplified response is clipped by clipper 11 and passed by the video AND gate 12 (now open) to the AND gates 13 and 14 in parallel. Because of conditions precedent (to be explained), only the AND gate 13 will be active to pass the clipped white-to-black video response to fire single shot 15. This single shot, like all other singe shots in the circuit, has a "G" and a "P" output tap. The "G" tap is a gating or continuous output for the duration of the astable operation of the single shot. The "P," or pulse output, is a diode-capacitator coupled output so as to yield a response only when the single shot turns off. The gating pulse from single shot 15 feeds AND gate 16, rendering it receptive to the amplified video signals from video amplifier 10. AND gate 16, thus activated, passes the amplified video signals to the normal video evaluator 17. Since the tracing beam is now passing within the black of the line 51 in the region from B to C (FIG. 3), the video evaluator 17 is testing the video signal for blackness. This test obviates false black response from a speck or smudge, and seeks to establish the black hit as a legitimate line hit.

The normal video evaluator 17 includes an integrating circuit and a latch with a minimum threshold voltage. If the amplified black video signal is sufficiently strong and persistent, the capacitor in the integrating circuit within the evaluator will accumulate charge to achieve a voltage level sufficient to set the latch to register the satisfactory test. The latch set condition appears as a signal on line 17*a*. The latch is reset by a pulse or signal applied to line 17*b* which also discharges the integrator circuit to destroy any accumulated charge.

If the normal evaluator 17 produces a black test satisfaction signal on line 17*a* which is combined in AND gate 18 with the pulse response of single shot 15 as it turns off, the operation shall continue. Since the timing of single shot 15 is 90° of beam time, the trace now occupies the position D in FIG. 3, wherein the attenuation shall take place. The black to white transition at point C is ignored as the video clipper 11 responds only to white to black transitions.

At point D, when single shot 15 turns off and the normal video evaluator 17 yields its latch signal on line 17*a*, AND gate 18 operates to fire single shot 21 through the serially connected OR gates 19 and 20. When single shot 21 fires its gate output resets the normal video evaluator 17, and through the line 203*a* and 205*a* operates the attenuators 203 and 205 (FIG. 1) to reduce the radius of trace for the requisite 60° to achieve the movement from D to E (FIG. 3).

When at point E (FIG. 3), representing the termination of the 60° attenuation period (measured by single shot 21), the single shot 21 turns off, its pulse output fires single shot 22. This single shot operates to blind the circuits to the white-to-black transition at the line edge 51*b* (point F in FIG. 3). This it does by operating through inverter 23 to remove the enabling potential from the video AND gate 12. Thus, the response of clipper 11 to the line intercept at point F is prevented from refiring single shot 15 as previously traced. It is this operation that regiments the apparatus to follow on one line edge only. Single shot 22 has a time constant of 120°, bringing the beam to point H before the circuits are operative to "see black" again. The transition from black to white at point G in FIG. 3, as the beam exits from the line has no effect.

At point H, when the single shot 22 turns off, single shot 24 turns on for 60°. This single shot, through inverter 25, de-activates AND gate 13 to prevent any black signals from operating single shot 15 during this period from H to J (FIG. 3). During this same period the presence of the gate pulse from single shot 24 activates AND gate 14 to permit an alternative more stringently tested operation to be described.

When at the end of the period for single shot 24 (point J, FIG. 3) AND gate 13 again becomes active, the black to white transition at B′ (FIG. 3) will effect a repeat of the operation just traced. Cessation of single shot 24 fires single shot 26 for a purpose also to be described.

Returning now to the period from H to J (FIG. 3), when single shot 24 is active, this period requires a blacker and more persistent response. With single shot 24 active, AND gate 14 is responsive to any clipped video response passed by AND gate 12 (single shot 22 is now down). Thus, any black hit in this period will fire single shot 27 whose gate output activates AND gate 28 to pass amplified video signals from amplifier 10 to the early black video evaluator 29. This evaluator is the same as the normal evaluator 17 except that it requires more black signal. Its latch threshold, for example, would be higher than that for the corresponding latch in the evaluator 17. If the evaluator 29 is satisfied, its latch will set, and upon the cessation of single shot 27 (90°), then AND gate 30 will pulse OR gate 19 to fire single shot 21 through OR 20 to repeat the cycle previously described. This early black will occur, for example, on an inside corner, and will result in faithful following. This extra evaluator might be eliminated, except that experience has shown that smudges and other defects require a more stringent test. If the early black is in fact set off by a smudge, the test will then fail and upon the cessation of single shot 24, the normal black circuits will be active to function as above-described.

If no line intercept occurs, as for example, in the instance of a line end or break in the line, the single shot 26 will initiate an artificial attenuation of the beam to cause the trace to move ahead in an effort to bridge the break. If, at the end of the period of single shot 26 neither the normal video evaluator 17 nor the early video evaluator 29 has been satisfied, then their respective latches will remain reset. The respective inverters 31 and 32 will yield potentials to AND gate 33 which also receives further potentials from the set side of flip-flop 34 and inverter 23 to fully energize the gate when the pulse output from single shot 26 occurs. The response of AND gate 33 resets flip-flop 34 and through OR 20 fires single shot 21 to produce the artificial attenuation. This will repeat that portion of the cycle previously explained, causing the trace to move forward. If, on the next cycle, no black intercept occurs, then the flip-flop 34, by virtue of its reset state will deny AND 33 one of its requisite inputs to prevent a second synthetic black cycle.

If, following a synthetic black operation, a legitimate black hit occurs, either early or normal, then the operation of OR 19 will set flip-flop 34 in preparation for a subsequent synthetic black operation. The flip-flop 34, therefore, prevents two successive synthetic black operations. The synthetic black operation will always occur at a line end, in order to test it for legitimacy. This will move the tracing beam slightly beyond the line end, and were it not an end, would bridge the gap. In the cycle following a line end test, the line intercept occurs on the underside of the line and the operation is now phased to this black to white transition.

Returning now to FIG. 2, let it be assumed that single shot 26 has initiated the synthetic black operation at a point corresponding to point D′. Single shots 21, 22, 24, and 26 will be refired in turn without any black signal or any repeat synthetic black operation. The circuits now will be receptive to an intercept on the lower line edge at a point corresponding in cycle time to point F (FIG. 3). At this time, all single shots are down so that AND 12 is receptive to clipper 11 signals as is AND 13 to pass them. Thus, single shot 15 will fire on the lower edge of the line and the trace will follow the lower edge in the line to the right. The operation will proceed as if FIG. 3 were rotated 180°, which in essence is what really happens, as the point of reference is always one of the two black intercepts. If two black intercepts do not occur within the prescribed time, then the synthetic black operation is initiated. The occurring black hit, following a synthetic black will re-establish the origin.

As has been stated, the deep follower produces information with respect to the reverse side of the line. "T joints" for example, may thus be detected. This function is achieved by AND gate 35 which receives inputs from video amplifier 10 and single shot 21. Since single shot 21 fires only on the side opposite to the edge being followed, then it will pass the video only during this time. Thus, if the apparatus were following the upper edge of the horizontal bar of a T, the beam, when it was rotating about the junction of the horizontal and vertical bars, would yield three black intercepts during a single rotation. The AND gate would be open for the 60° at the bottom of the trace, corresponding to the arc from D to E (FIG. 3). At this time, the trace would be buried in the black of the vertical bar and the output of AND gate 35 would be a black signal indicative of the presence of an intersecting character fragment. This information coupled with positional information obtained from a matrix superposition apparatus such as that disclosed in the copending application of Evon C. Greanias et al., Ser. No. 305,254, filed Aug. 29, 1963, issued on Aug. 16, 1966, as U.S. Patent No. 3,267,285 and also assigned to the International Business Machines Corporation offers one means of direct feature identification without processing the time variant analog voltages produced at the hubs *246a* and *247a*.

While a simple circuit for delineating information with respect to the reverse side of the line has been shown, specifically AND 35 operated from single shot 21, it will readily be appreciated that the black return signal may be further dissected or analyzed with respect to the line edge being followed. A succession of single shots (or a tapped delay line) to provide a series of clock pulses could be phased to start operation with the firing of single shot 15 or single shot 27 to provide a timing reference for the black return signals. Thus, the circle could be partitioned into as many sectors as required. With sufficiently fine resolution corners may be distinguished from T joints and direct feature identification achieved. This form of identification is binary in nature, in that the signals may be directly logically combined as combinations of the presence or absence of signals. This logical processing capability is in addition to the analog signals generated at the terminals *246a* and *247a*. It is thus that this follower operates to yield both an analog and digital information by employing a circular scanning pattern having a diameter greater than the thickness of the line being followed.

While the invention has been particularly shown and described with reference to a preferred embodiment thereof, it will be understood by those skilled in the art that various changes in form and details may be made therein without departing from the spirit and scope of the invention.

What is claimed is:

1. An electronic curve follower for following a line pattern comprising:

(a) means for imaging a radiant spot upon the line pattern, the said spot having a dimension less than the line thickness;

(b) means for animating the said spot in a circular path having a greater diameter which is greater than the thickness of the line which defines the pattern;

(c) radiant energy responsive means for detecting the presence of said spot within the said line; and (d) means under control of said radiant energy responsive means for reducing the diameter of said circular path to a lesser diameter for a given time duration starting a predetermined interval following the passage of said spot into one edge only of said line.

2. The electronic curve follower of claim 1 in which the means under control of said radiant energy responsive means for reducing the diameter of said circular path includes timing means for producing a delay following the passage of said spot into one edge of said line equal to the time required for the spot to rotate 90° in said circular path, and the period in which the spot rotates at the lesser diameter is equal to the time required for the spot to rotate 60° at the greater diameter.

3. The electronic curve follower of claim 1 wherein the ratio of the lesser diameter to the greater diameter of circular paths is one half.

4. The electronic curve follower of claim 1 wherein the animating means comprises a cathode ray tube, including beam deflection means, together with means for applying sinusoidal waveforms in quadrature to the deflection means.

5. The electronic curve follower of claim 1 in which said means under control of said radiant energy responsive means includes means for instantaneously shifting the center of rotation of the circular path without producing any sharp discontinuity in the path.

6. A curve follower for following a line pattern comprising:

(a) means for imaging a radiant spot upon the pattern, the said spot having a maximum dimension substantially smaller than the thickness of the line defining the pattern;

(b) means for alternately animating the said spot in two joined circular paths having two different respective radii;

(c) radiation responsive means for detecting the absorption by said line pattern of the radiation from said radiant spot;

(d) testing means connected to said radiation responsive means for testing the quantity and persistence of the energy absorbed by said line and yielding a control signal upon the occurrence of a predetermined quantity and persistence of absorption; and (e) means connected to said radiation responsive means and to said testing means, and operative responsive to the interception of said radiant spot with the edge of said line pattern and to said control signal to initiate the animation of said spot at the lesser of the said two radii at a predetermined time delay following the interception and to control the animation at the lesser radius for a given predetermined time duration.

7. The curve follower of claim 6 wherein said testing means includes integrating means and a latch, the said integrating means being operative responsive to said radiation responsive means to accumulate a voltage charge in response to the lack of energy incident upon said radiation detection means, manifesting an energy absorption by said line pattern, and said latch being operative responsive to the accumulation of a given charge in said integrator.

8. An electronic curve follower for following a line pattern defining a lexical symbol and producing signals particularly useful in an apparatus for identifying the symbol comprising:

(a) means including a cathode ray tube for imaging a concentrated spot of light upon the line pattern;

(b) means for applying control voltages to said cathode ray tube for moving the said spot in a circular path having a diameter greater than the thickness of said line;

(c) photodetection means for detecting the quantity of light reflected from said line pattern as said spot moves within and without said line;

(d) testing means connected to said photodetector means and operative responsive to the output thereof to test the absorption of said line of the light energy from said spot and yielding a control signal upon the measurement of a given quantity of energy; and (e) means responsive jointly to said control signal and to the entrance of said spot within said line, as detected by said photodetector to instantaneously shift the center of rotation of the circular path and reduce the radius thereof for a given time duration beginning a fixed delay following the entrance of the spot into said line.

9. An electronic curve follower for following a line pattern, comprising:

(a) a cathode ray tube including beam focusing and beam deflection means for producing a movable luminous spot on the face of the tube;

(b) means imaging the said spot upon the line pattern;

(c) a pair of integrators connected to said beam deflection means;

(d) means for introducing sinusoidal waveforms in quadrature to said integrators;

(e) attenuating means for selectively setting the amplitude of said waveforms at one of two levels;

(f) photodetector means for detecting the absorption of energy from said imaged spot by said line pattern as said spot moves within and without said line;

(g) first testing means connected to said photodetector and operative to measure the quality of the line by measuring the energy absorption by said line and yielding a first control signal upon the measurement of a given absorption;

(h) second testing means connected to said photodetector and operative responsive to an energy absorption greater than that required for said first testing means to yield a second control signal;

(i) timing means operative responsive to the detection by said photodetector of the entrance of said spot into said line for initiating a first timing interval $T_1$;

(j) means for rendering said first testing means operative during said period $T_1$;

(k) means responsive at the end of the period $T_1$ to said first control signal for initiating a succession of timing periods $T_2$, $T_3$, $T_4$, and $T_5$;

(l) means operative during the period $T_2$ for controlling said attenuating means to reduce the amplitude of said sinusoidal waveforms;

(m) means operative during the period $T_3$ for rendering the response of said photodetector means ineffectual to produce a reinitiation of the timing period $T_2$;

(n) means operative during the period $T_4$ for rendering said second testing means operative; and (o) means operative responsive at the end of the $T_3$ period for initiating a single succession of timing periods $T_2$, $T_3$, $T_4$, and $T_5$ upon the absence of control signals from said first and second testing means.

10. The curve follower of claim 9 having additional means operative during the period $T_2$ for rendering said photodetector means operative to yield signals manifestive of discontinuities in that edge of the line opposite to the edge that initiated the timing period $T_1$.

11. The curve follower of Claim 9 wherein the timing interval $T_1$ is equal to 90° of circular movement of said spot, $T_2$ equals 60°, $T_3$ equals 120°, $T_4$ equals 60°, and $T_5$ equals 120°.

References Cited

UNITED STATES PATENTS

| | | | |
|---|---|---|---|
| 3,229,100 | 1/1966 | Greanias | 250—202 |
| 3,245,036 | 4/1966 | Gottrup | 250—202 X |
| 3,267,285 | 8/1966 | Greanias et al. | 250—219 |
| 3,289,004 | 11/1966 | Greanias et al. | 340—146.3 X |

WALTER STOLWEIN, *Primary Examiner.*